United States Patent [19]

Cooper et al.

[11] 3,929,749
[45] Dec. 30, 1975

[54] PROCESS FOR RECOVERING BORON TRIFLUORIDE

[75] Inventors: Terence Alfred Cooper, Newark, Del.; Anestis Leonidas Logothetis, Louisville, Ky.

[73] Assignee: E. I. Du Pont de Nemours & Company, Wilmington, Del.

[22] Filed: Mar. 1, 1974

[21] Appl. No.: 447,256

[52] U.S. Cl. ............... 260/86.7; 252/414; 252/433; 260/33.8 UA; 260/606.5 B; 260/683.44; 423/293
[51] Int. Cl.² ............... C08F 210/00; C08F 212/00; C08F 218/00; C01B 35/06
[58] Field of Search ....... 260/86.7, 606.5 B, 683.44, 260/33.8 UA; 252/433, 414; 423/293

[56] References Cited
UNITED STATES PATENTS

| | | | |
|---|---|---|---|
| 2,419,504 | 4/1947 | Schulze et al. | 260/683.44 |
| 3,000,964 | 9/1961 | Milligan | 252/414 |
| 3,231,334 | 1/1966 | Guarnaccio | 423/293 |
| 3,352,894 | 11/1967 | Crain et al. | 260/606.5 B |
| 3,647,771 | 3/1972 | Nakaguchi et al. | 260/86.7 |
| 3,793,262 | 2/1974 | Logothetis | 260/86.7 |

FOREIGN PATENTS OR APPLICATIONS
1,123,723   6/1966   United Kingdom

OTHER PUBLICATIONS

H. S. Booth et al., "BF$_3$ and its Deriv." John Wiley, N.Y., 1949.
Topchiev et al. "Boron Fluoride & its Compounds in Organic Chemistry", Pergamon Press, N.Y., N.Y., 1959.

*Primary Examiner*—Joseph L. Schofer
*Assistant Examiner*—Herbert J. Lilling

[57] ABSTRACT

Boron trifluoride is recovered from a copolymer containing ethylene units and alkyl acrylate units, wherein said alkyl acrylate units are complexed with boron trifluoride, by heating a solution of said copolymer under anhydrous conditions in an inert solvent at a temperature and pressure sufficient to decompose the alkyl acrylate-boron trifluoride complex and passing superheated inert solvent for the copolymer into the copolymer solution to remove uncomplexed boron trifluoride from the copolymer and recovering the boron trifluoride for recycle.

5 Claims, No Drawings

PROCESS FOR RECOVERING BORON TRIFLUORIDE

BACKGROUND OF THE INVENTION

This invention relates to a process for recovering boron trifluoride. More particularly, the invention is directed to a process for recovering boron trifluoride from a copolymer containing ethylene and a boron trifluoride-alkyl acrylate complex.

Boron trifluoride has been used as a catalyst component for making alternating copolymers of ethylene and alkyl acrylates. Application Ser. No. 230,483, filed Feb. 29, 1972, now U.S. Pat. No. 3,793,262 discloses a procedure for making such alternating copolymers which comprises reacting in solution in an inert solvent about 1–20 mole percent based on moles of solvent of at least one alkyl acrylate, said alkyl group having 2–8 carbon atoms, with ethylene at a temperature of about −10°C. to about 200°C., and in the presence of boron trifluoride at pressures sufficient to keep the alkyl acrylate complexed with boron trifluoride, and adding about 0.05–5.0 parts of a free radical polymerization initiator for every 100 parts by weight of alkyl acrylate. Such alternating copolymers made in a synthesis employing boron trifluoride have outstanding resistance to oils, and demonstrate excellent resistance to thermal and oxidative degradation. However, the synthesis of these and similar alternating copolymers at a desirable rate requires the use of rather substantial quantities of boron trifluoride, namely, at least one mole of boron trifluoride per mole of acrylate present. Thus, about 40 to 60 grams of boron trifluoride are used for each 100 grams of alternating copolymer produced. These amounts of boron trifluoride add substantially to the cost of making the copolymers. In order to manufacture copolymers of ethylenealkyl acrylate economically, it is, therefore, important to recover the boron trifluoride in a manner in which it can be recycled for reuse in the polymerization process while, at the same time, the recovery technique employed must not have a detrimental effect on the copolymer, for example, cause polymer degradation. Although steam stripping of a solution of alternating copolymer containing boron trifluoride complexed with an alkyl acrylate has been used to isolate uncomplexed copolymer, such a procedure results in hydrolysis of the boron trifluoride and, therefore, it cannot be recycled for reuse in the polymerization system.

SUMMARY OF THE INVENTION

It has now been discovered that boron trifluoride can be removed and recovered for recycle from a copolymer of ethylene/alkyl acrylate wherein the boron trifluoride is complexed with alkyl acrylate units. This is accomplished by heating a solution of said ethylene/alkyl acrylate-$BF_3$ complex copolymer under anhydrous conditions in an inert solvent to a temperature and at a pressure sufficient to decompose the alkyl acrylate-boron trifuloride complex while simultaneously passing superheated inert solvent for the copolymer into the copolymer solution so as to cause turbulence of the solution of copolymer, thereby removing gaseous uncomplexed boron trifluoride from the resulting liquid mixture and recovering boron trifluoride. The boron trifluoride in the gaseous state is then recycled for reuse in the polymerization system. Generally, temperatures of the copolymer solution sufficient to decompose the alkyl acrylate-boron trifluoride complex are within the range of about 100°C.–300°C. Pressures of the order of between about 50–350 pounds per square inch are usually used in conjunction with the temperatures in order to keep at least a major portion of the inert solvent in the liquid state. Additional inert solvent, preferably a chlorinated aliphatic hydrocarbon, is superheated, that is, heated above its boiling point but kept in the liquid state, and introduced into a flasher containing complexed alternating copolymer to remove uncomplexed boron trifluoride.

DESCRIPTION OF PREFERRED EMBODIMENTS

Copolymers of ethylene and alkyl acrylate complexed with boron trifluoride, and optionally said copolymer containing a cure-site monomer, can be made according to the procedures described in application Ser. No. 230,483, filed Feb. 29, 1972, now U.S. Pat. No. 3,793,262 and application Ser. No. 233,741, filed March 10, 1972, the disclosures of which are incorporated herein by reference. The reactor effluent containing the resulting ethylene/alkyl acrylate copolymer complexed with boron trifluoride is heated in a flasher to a temperature sufficient to decompose the complex. In general, temperatures within the range of about 100°C.–300°C., preferably 110°–170°C. are sufficient to decompose the complex and liberate boron trifluoride. Pressures of the order of 50–350, preferably 80–300, pounds per square inch are usually employed together with the higher temperatures. Pressure is regulated so that as the temperature is increased to break the complex, the pressure is also increased so that at least a major portion of the inert solvent containing the copolymer solution is not volatilized. The pressure is preferably lower than that prevailing in the reactor, and can be atmospheric or subatmospheric; thus the recovery vessel is preferably a flasher. An additional amount of inert solvent in a superheated state is also pumped under pressure into the solution of complexed copolymer being treated. Thus, the liberated boron trifluoride exits overhead and is returned, generally as a gas, to the polymerization reactor.

Any inert solvent can be used in the boron trifluoride recovery process that is capable of dissolving the copolymer. The same inert solvent that is used during polymerization is ordinarily added during boron trifluoride recovery due to ease of operation. Representative solvents include chlorinated aliphatic hydrocarbons such as dichloromethane, dichloroethane and chloroform; aromatic hydrocarbons such as benzene, toluene and xylene, and chlorinated aromatic solvents such as chlorobenzene. Dichloromethane and dichloroethane are the preferred inert solvents used to sparge copolymer. The quantity of inert solvent that is used in the process can vary widely. Sufficient amount should be present during sparging to dissolve all the copolymer and make the solution fluid. Generally, at least 10% and usually not more than a 30% concentration of copolymer is present in the inert solvent. The superheated inert solvent used in the $BF_3$ recovery process for sparging the copolymer solution in the flasher can be obtained from solvent recovered during the conventional isolation of the uncomplexed copolymer and recirculated for use. Also, of course, fresh quantities of inert superheated solvent can be added to the boron trifluoride flasher under pressure so as to cause turbulence of the copolymer solution.

The process of the present invention results in the removal of 95-99% of the boron trifluoride that is complexed with the alkyl acrylate in a matter of minutes.

Uncomplexed alternating copolymer is isolated from solution by conventional methods such as drum drying, extruder screw press drying, and steam isolation. Solvent and residual monomer is generally recovered and recycled to the polymerization reactor.

For a clearer understanding of the invention, the following specific example is given, which illustrates, but does not limit, the invention.

A continuous 2-liter pressure reactor is used, fabricated from a high nickel-copper alloy ("Monel"), equipped with gas and liquid feed lines, and operated at 50°C. with a residence time of one hour. Two phases are maintained. The liquid phase at steady state contains 1500 ml of methylene chloride ($CH_2Cl_2$) solvent, 100 grams (1.0 gram-mole) of ethyl acrylate, 68 grams (1.0 gram mole) of boron trifluoride ($BF_3$), 0.5 gram of azobis (isobutyrylonitrile), and ethylene. The gas phase at steady state is maintained at 200 p.s.i.g. with ethylene and $BF_3$.

Reactor effluent containing the resulting alternating ethylene/ethyl acrylate copolymer (complexed with $BF_3$), ethylene, ethyl acrylate-$BF_3$ complex, and solvent flows through a conduit having a level control valve to a flasher operated under anhydrous conditions at 135°C. and 150 p.s.i.g. The copolymer solution is contacted with superheated recycle solvent vapor which is pumped into the bottom of the flasher thereby causing turbulence of the mixture. The superheated solvent causes gaseous $BF_3$ to be quantitatively removed from the copolymer for recycle to the reactor. Boron trifluoride, ethylene, and some of the solvent leave the flasher by way of an overhead vapor conduit, pass through a pressure control valve to a compressor where the pressure is raised to 500 p.s.i.g., continue on to a condenser and enter a flash valve. The resulting gas/liquid mixture which emerges at 210 p.s.i.g. enters a purge chamber from which inerts (such as nitrogen, ethane, and methane) can be bled periodically. Liquified $CH_2Cl_2$ leaves the bottom of the flash chamber and flows via a liquid level control valve back to the reactor. Make-up ethyl acrylate is added to this liquid recycle line. Gaseous ethylene and $BF_3$ pass overhead from the purge chamber and flow along a recycle conduit to the reactor. Make-up gaseous ethylene is supplied by way of a conduit joining the gas recycle conduit.

The hot solution of alternating ethylene/ethyl acrylate copolymer, ethyl acrylate, and $CH_2Cl_2$ leaving the flasher flows to a produce recovery unit containing a steam stripper operated at atmospheric pressure. Copolymer crumbs leaving the steam stripper are collected, passed through a screw press dryer, and conveyed to compactors. The gaseous mixture of water vapor, ethyl acrylate and methylene chloride exiting the steam stripper is cooled in a condenser, the resulting water/organic phases being separated in a decanter. The wet liquid organic phase exiting the decanter is fractionally distilled to separate ethyl acrylate from methylene chloride. After being subsequently dried, the ethyl acrylate is recycled to the reactor. Methylene chloride, after being dried, enters a recycle conduit. Part of the dry methylene chloride is sent back to the reactor as superheated liquid at 50°C. and 210 p.s.i.g. The remaining dry methylene chloride is pumped along a separate conduit to a heater and passed through a flash valve, the emerging superheated vapor being conducted to the flasher for sparging $BF_3$. Introduction of recycle solvent vapor in this manner avoids undesired loss of solvent from the reactor effluent in the flasher. The solution exiting the flasher has a low enough viscosity for satisfactory pumping.

We claim:

1. In a process for recovering boron trifluoride from a copolymer containing ethylene units and alkyl acrylate units complexed with boron trifluoride, the improvement which comprises heating a solution of said copolymer under anhydrous conditions in an inert liquid solvent for said copolymer to a temperature and at a pressure sufficient to decompose the alkyl acrylate-boron trifluoride complex while simultaneously passing superheated inert liquid or gaseous solvent for the copolymer into the copolymer solution so as to cause turbulence of the solution of copolymer, thereby removing gaseous uncomplexed boron trifluoride from the liquid mixture for recycle.

2. A process of claim 1 wherein the copolymer solution is heated within a range of about 100°-300°C.

3. A process of claim 2 wherein the copolymer solution is maintained at a pressure between about 50-350 pounds per square inch.

4. A process of claim 3 wherein the inert solvent is a chlorinated aliphatic hydrocarbon.

5. A process of claim 1 wherein inert solvent for the copolymer is methylene chloride, the temperature is between about 110°-170°C., and the pressure is between about 80-300 pounds per square inch.

* * * * *